US010800081B2

(12) United States Patent
Chou

(10) Patent No.: US 10,800,081 B2
(45) Date of Patent: Oct. 13, 2020

(54) THERMAL PLASTIC ELASTOMER INJECTION MOLD, WATER IMPERVIOUS SLIDE FASTENER MANUFACTURED UTILIZING THE SAME AND FINISHED PRODUCT HAVING THE WATER IMPERVIOUS SLIDE FASTENER

(71) Applicants: Chao-Mu Chou, Taipei (TW); Shiu-Yin Cheng, Taoyuan (TW)

(72) Inventor: Chao-Mu Chou, Taipei (TW)

(73) Assignees: Chao-Mu Chou, Taipei (TW); Shiu-Yin Cheng, Taoyuan (TW)

( * ) Notice: Subject to any disclaimer, the term of this patent is extended or adjusted under 35 U.S.C. 154(b) by 116 days.

(21) Appl. No.: 15/994,867

(22) Filed: May 31, 2018

(65) Prior Publication Data

US 2018/0360172 A1 Dec. 20, 2018

(30) Foreign Application Priority Data

Jun. 16, 2017 (TW) .............................. 106120091 A

(51) Int. Cl.
*B29C 45/14* (2006.01)
*A44B 19/32* (2006.01)
*B29D 5/02* (2006.01)

(52) U.S. Cl.
CPC ........ *B29C 45/14573* (2013.01); *A44B 19/32* (2013.01); *B29C 45/14065* (2013.01); *B29D 5/02* (2013.01); *Y10S 425/814* (2013.01)

(58) Field of Classification Search
CPC ................ A44B 19/32; B29C 45/2708; B29C 45/14065; B29C 45/14573; Y10S 425/814; B29L 2005/00; B29D 5/00
See application file for complete search history.

(56) References Cited

U.S. PATENT DOCUMENTS

| 3,501,816 A | 3/1970 | Heimberger |
| 4,112,150 A * | 9/1978 | Brown ............... A44B 19/32 427/284 |
| 5,437,888 A | 8/1995 | Orlieb |
| 7,416,397 B2 * | 8/2008 | Kusayama ............ A44B 19/08 425/116 |
| 8,454,338 B2 * | 6/2013 | Yang ................... A44B 19/32 118/77 |
| 2010/0125982 A1 * | 5/2010 | Chou ................... A44B 19/32 24/397 |

* cited by examiner

*Primary Examiner* — Joseph S Del Sole
*Assistant Examiner* — Jerzi H Moreno Hernandez
(74) *Attorney, Agent, or Firm* — Guice Patents PLLC

(57) ABSTRACT

A thermal plastic elastomer injection mold comprises: a mold base, formed with a platform having a top surface thereof formed with an arc-shaped surface adhered with a pair of support-tapes of a slide fastener and formed with an elongated arc-shaped ridge having a wedge-shaped tip thereby being able to be stably moved into a gap between the pair of support-tapes and a surface of the arc-shaped ridge is formed with a thermal plastic elastomer injection port connected to at least one extruder; and a thermal plastic elastomer, extruded out from the at least one extruder and passing the thermal plastic elastomer injection port so as to be injected into the gap and slits inside two rows of coupling elements disposed at inner edges of the pair of support-tapes, wherein the slide fastener is formed with a water impervious structure after the thermal plastic elastomer inside the gap is cut.

11 Claims, 11 Drawing Sheets

THERMAL PLASTIC ELASTOMER INJECTION MOLD, WATER IMPERVIOUS SLIDE FASTENER MANUFACTURED UTILIZING THE SAME AND FINISHED PRODUCT HAVING THE WATER IMPERVIOUS SLIDE FASTENER

BACKGROUND OF THE INVENTION

1. Field of the Invention

The present invention relates to thermal plastic elastomer injection mold, especially to a thermal plastic elastomer injection mold allowing a thermal plastic elastomer to be injected and filled in slits inside two rows of continued coupling elements of a slide fastener, thereby enabling the slide fastener to be provided with a water impervious function.

2. Description of Related Art

A slide fastener is commonly seen in daily life and often deemed as a necessary fastening device; because of the feature of easily to be opened or closed, the slide fastener is often adopted in a garment, for example a cloth or pants, a portable device, for example a hand bag or backpack, or a camping tool, for example a tent or a sleeping bag.

As a matter of fact, for providing the above-mentioned products with a windproof and waterproof function, a material having a waterproof feature has already been adopted, for example a waterproof nylon fabric or a water repellent treatment is adopted, for fabricating the outer fabric of a ski wear, and a waterproof inner lining can be additionally provided for achieving the waterproof function. However, the slide fastener served as an opening and closing component is not provided with the comprehensive waterproof function, especially a central gap of the slide fastener and slits between coupling elements would be stretched by a transversal pulling force generated while the slide fastener being in use, the gap and the slits are the most difficult parts of being provided with the waterproof effect for the slide fastener, so that the whole waterproof effect of the slide fastener cannot be fully served or cannot be even provided.

In view of the above-mentioned disadvantages, the skilled people in the art have improved the whole structure of the slide fastener for being provided with a function of preventing a fluid from permeating, take U.S. Pat. Nos. 3,501,816 and 5,437,888 for examples, the two patents have both disclosed a water impervious slide fastener, wherein an thermal plastic elastomer is injected from the exterior of two rows of coupled coupling elements to the interior thereof, so that the thermal plastic elastomer can be served to cover at the exterior of the two rows of coupling elements. The above-mentioned thermal plastic elastomer used for covering for the purpose of being water imperious is not injected from a gap of a pair of support-tapes into slits inside the coupling elements. As such, the thermal plastic elastomer of the water impervious slide fastener is only covered on outer surfaces of the two rows of coupling elements, the thermal plastic elastomer and a slider are formed in a direct contacting status, so that a great friction is generated between the above two, and the thermal plastic elastomer is worn by the slider and the service life is inevitably shortened; meanwhile, the opening and closing operation of the slide fastener would be very unsmooth, and the slide fastener would be heavy and inflexible, thereby losing the softness feature. The above-mentioned water impervious slide fastener is unable to be applied in a garment or a bag which are generally light and easy to be worn or carried, and only can be applied in some special garment, such as a diving suit; accordingly, the above-mentioned disadvantages shall be seriously concerned by the skilled people in the art.

SUMMARY OF THE INVENTION

One primary objective of the present invention is to provide a thermal plastic elastomer injection mold, wherein a thermal plastic elastomer injection port thereof is served to allow a thermal plastic elastomer to be injected from a gap between a pair of support-tapes of a slide fastener into slits inside two rows of continued coupling elements and the gap, thereby enabling the slide fastener to be formed as a water imperious slide fastener.

For achieving said objective, one technical solution provided by the present invention is to provide a thermal plastic elastomer injection mold, which comprises: a mold base, formed with a slide fastener supporting platform having a top surface thereof formed with an arc-shaped surface, wherein the arc-shaped surface supports a pair of support-tapes of a slide fastener and is formed with a transversally elongated arc-shaped ridge thereon, two ends of the arc-shaped ridge are respectively formed with a front end and a rear end, and the front end is formed with a wedge-shaped tip capable of being inserted into a gap formed between the pair of support-tapes, thereby allowing the gap to be transversally displaced with the arc-shaped ridge, and a surface of the arc-shaped ridge is longitudinally formed with a thermal plastic elastomer injection port connected to at least one extruder; and a thermal plastic elastomer, extruded out from the at least one extruder and passing the thermal plastic elastomer injection port so as to be injected into the gap and into slits inside two rows of coupling elements disposed at inner edges of the pair of support-tapes, wherein the slide fastener is formed with a water impervious structure after the thermal plastic elastomer inside the gap is cut.

Another objective of the present invention is to provide a water impervious slide fastener fabricated by utilizing the above-mentioned thermal plastic elastomer injection mold.

One another objective of the present invention is to provide a finished product having the above-mentioned water impervious slide fastener, which can be applied in a garment, for example a cloth or pants, a portable device, for example a hand bag or backpack, or a camping tool, for example a tent or a sleeping bag.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
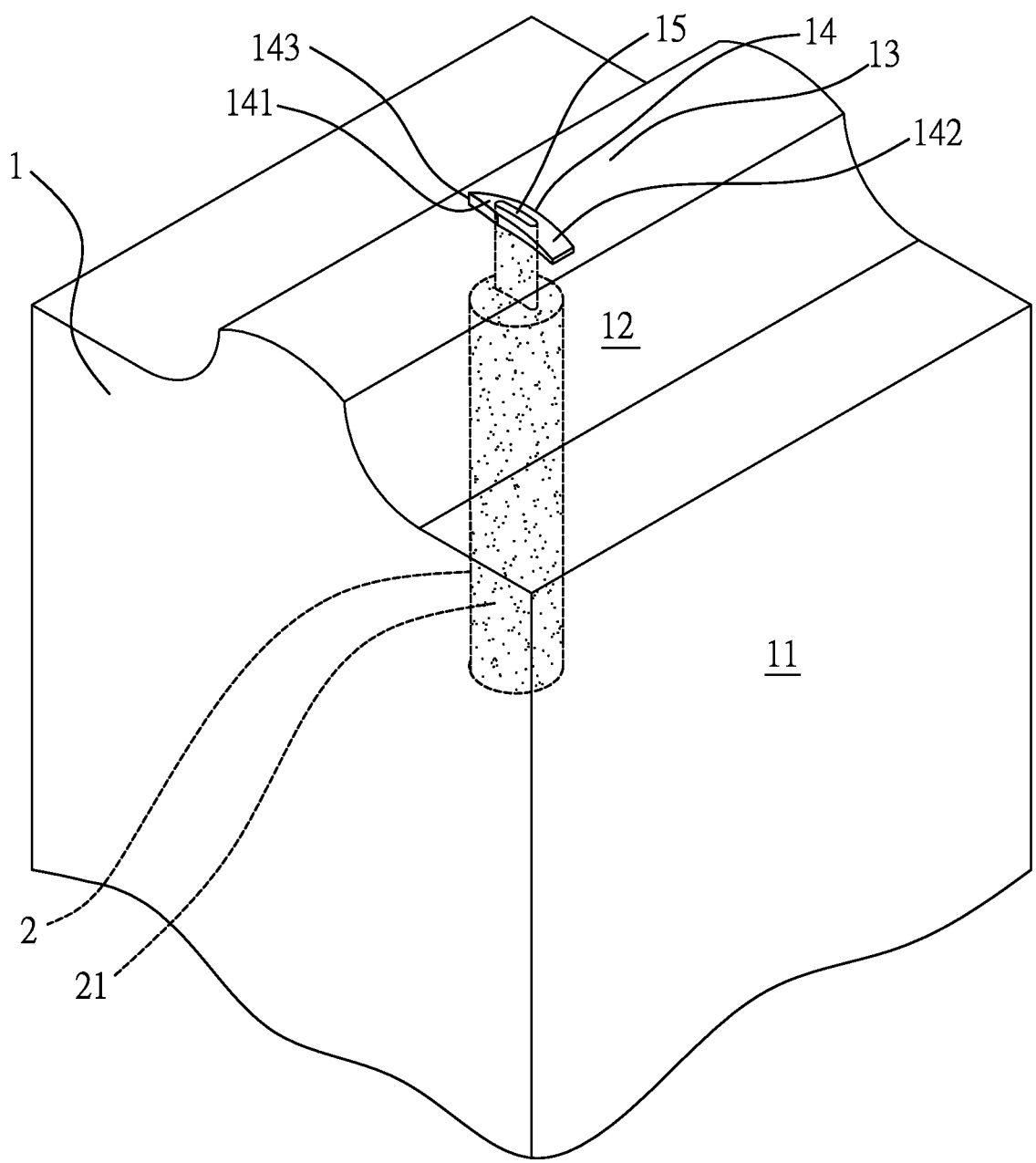
FIG. 1 is a perspective view illustrating a thermal plastic elastomer injection mold according to a first embodiment of the present invention.

Please refer to FIG. 1, which is a perspective view illustrating a thermal plastic elastomer injection mold 1 according to a first embodiment of the present invention. As shown in FIG. 1, the thermal plastic elastomer injection mold 1 includes a mold base 11, the mold base 11 is formed with a slide fastener supporting platform 12 having a top surface thereof formed with an arc-shaped surface 13, the arc-shaped surface 13 is transversally and protruding formed with an elongated arc-shaped ridge 14, and two ends of the arc-shaped ridge 14 are respectively formed with a front end 141 and a rear end 142, a substantial central location of the arc-shaped ridge 14 is longitudinally formed with a thermal plastic elastomer injection port 15 connected to at least one extruder 2. The width and the height of the arc-shaped ridge 14 and the dimension of the thermal plastic elastomer injection port 15 are determined with respect to the size of a slide fastener, and the thermal plastic elastomer injection mold 1 can be disposed with at least one heater with a proper heating power for allowing a thermal plastic elastomer 21 to be in a constant melting status.

Figure 2:
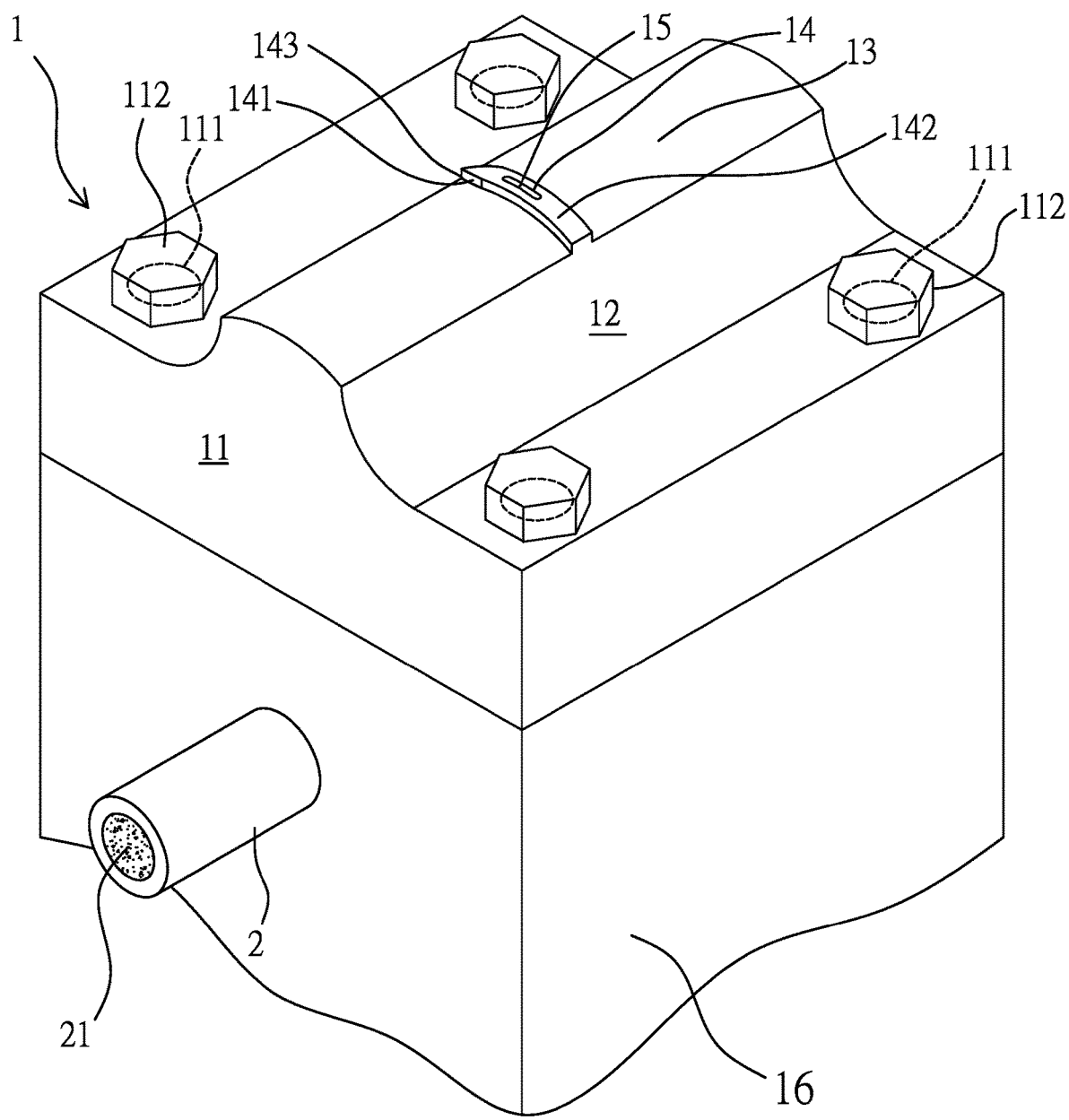
FIG. 2 is a perspective view illustrating the thermal plastic elastomer injection mold according to a second embodiment of the present invention.

Please refer to FIG. 2, which is a perspective view illustrating the thermal plastic elastomer injection mold 1 according to a second embodiment of the present invention. For satisfying different thermal plastic elastomer injection requirements of slide fasteners with various sizes, the thermal plastic elastomer injection mold 1 further includes a fasten seat 16, adjacent surfaces of the fasten seat 16 and the mold base 11 are correspondingly formed with at least one fasten hole, for example a screw hole (not shown in figures because of projection angle) and at least one connection hole 111, for example a stepped penetrated hole, and a connection member 112, for example a screw rod, is allowed to pass each of the connection holes 111 and locked in each of the fasten holes, so that the mold base 11 can be assembled with the fasten seat 16, or the mold base 11 can be disassembled with the fasten seat 16.

Figure 3:
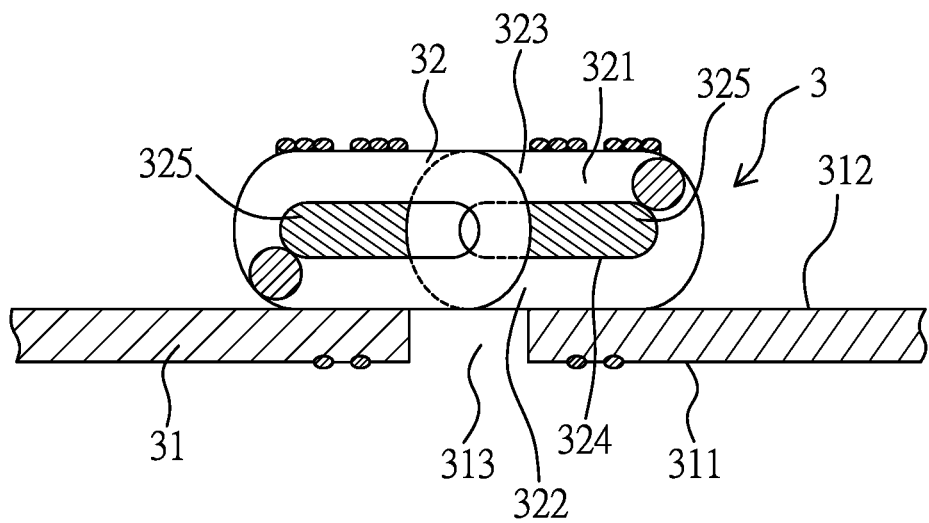
FIG. 3 is a cross sectional view illustrating a slide fastener, wherein a thermal plastic elastomer injection operation yet being processed to the slide fastener.

Please refer to FIG. 3, which is a cross sectional view illustrating a slide fastener 3, wherein a thermal plastic elastomer injection operation yet being processed to the slide fastener 3. The slide fastener 3 includes a pair of support-tapes 31 which are arranged in parallel, a gap 313 is formed between the pair of support-tapes 31, and each of the support-tapes 31 is formed with a first surface 311 and a second surface 312 opposite to the first surface 311; and two rows of continued coupling elements 32 respectively disposed at an inner edge of each of the second surfaces 312 of the pair of support-tapes 31, and the continued coupling elements 32 are formed in a coupled status at the location of the gap 313, slits 321 are formed between the adjacent coupling elements 32 in each row, each of the coupling elements 32 is formed with a bottom layer 322, a top layer 323 and an inner chamber 324, and a core 325 is disposed in the inner chamber 324.

Figure 4:
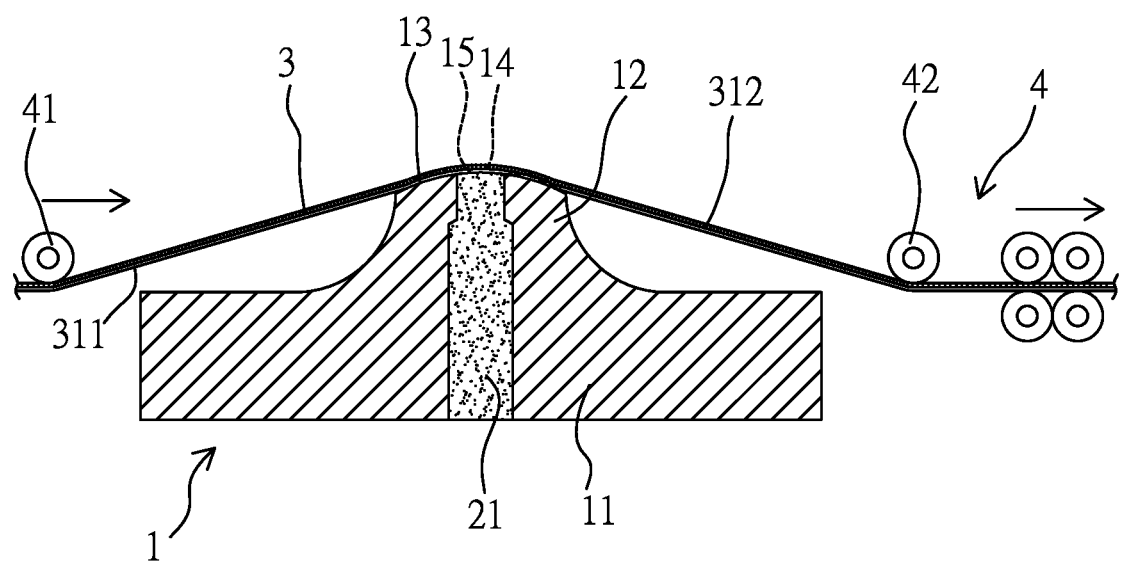
FIG. 4 is a schematic view illustrating the slide fastener of FIG. 3 being disposed on the thermal plastic elastomer injection mold.

Please refer to FIG. 4, which is a schematic view illustrating the slide fastener 3 being disposed on the thermal plastic elastomer injection mold 1. One side, for example a front side, of the thermal plastic elastomer injection mold 1 is disposed with a front guide wheel 41 of a transmission mechanism 4, and another side, for example a rear side, is disposed with a rear guide wheel 42 of the transmission mechanism 4. The slide fastener 3 is able to be tightly held on the arc-shaped surface 13 of the thermal plastic elastomer injection mold 1 via a guiding and pressing effect provided by the front guide wheel 41 and the rear guide wheel 42. A force for causing the slide fastener 3 to be tightly held on the arc-shaped ridge 14 is proportional to injection power of the thermal plastic elastomer 21, in other words the force for causing the slide fastener 3 to be tightly held on the arc-shaped ridge 14 can be adjusted via setting different vertical positions of the front guide wheel 41 and the rear guide wheel 42, thereby adjusting injection power of the thermal plastic elastomer 21. Moreover, the height of the thermal plastic elastomer 21 in the gap 313 can be adjusted via the vertical positions of the rear guide wheel 42; when the rear guide wheel 42 is at a lower position, the arc-shaped ridge 14 and the slide fastener 3 are in a fully contacting status; when the rear guide wheel 42 is at a higher position, the slide fastener 3 is separated from a certain point of the arc-shaped ridge 14 defined along a longitudinal length of the arc-shaped ridge 14, so that the height of the thermal plastic elastomer 21 in the gap 313 is defined by the height of a separation point where the slide fastener 3 is separated from the arc-shaped ridge 14.

Figure 5:
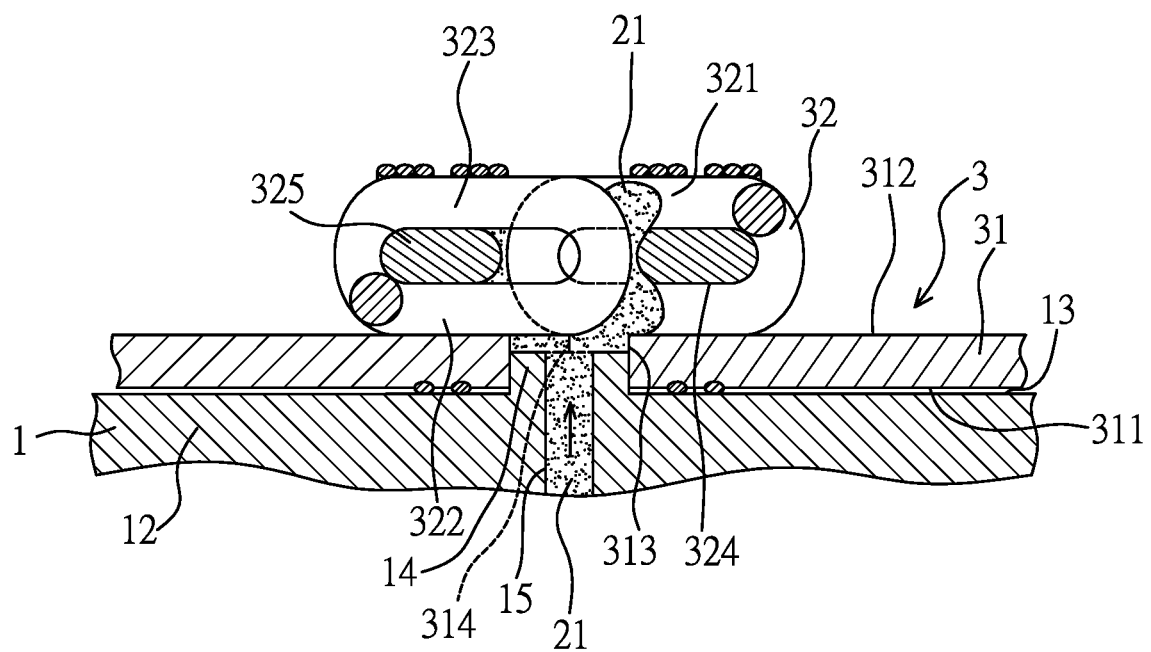
FIG. 5 is a cross sectional view illustrating the slide fastener being processed with the thermal plastic elastomer injection operation by utilizing the thermal plastic elastomer injection mold of FIG. 4.

Please refer to FIG. 1, FIG. 4 and FIG. 5, the height of the front end 141 and the height of the rear end 142 of the arc-shaped ridge 14 are substantial the same, and the front end 141 is formed with a wedge-shaped tip 143, so that the arc-shaped ridge 14 is able to be stably moved into the gap 313 of the pair of support-tapes 31, and the gap 313 is able to be transversally displaced with the arc-shaped ridge 14. Wherein, the height of the arc-shaped ridge 14 is smaller than or equal to the thickness of the pair of support-tapes 31, and the support-tapes 31 is served as an insulation layer, so that the high-temperature arc-shaped ridge 14 is prevented from being in direct contact with the bottom layers 322 of the two rows of coupling elements 32 so as to avoid any damage; for example, if the thickness of the pair of support-tapes 31 is 0.55 mm, the height of the arc-shaped ridge 14 is smaller than or equal to 0.55 mm, but preferably to be thinner than 0.50 mm. In the thermal plastic elastomer injection operation, the arc-shaped ridge 14 is fit in the gap 313 of the pair of support-tapes 31, the extruder 2 is served to extrude the thermal plastic elastomer 21 for being outputted from the thermal plastic elastomer injection port 15 and passing the gap 313, so that the thermal plastic elastomer 21 can be injected into the slits 321 inside the adjacent coupling elements 32 and a partial portion defined inside the gap 313.

As mentioned above, the arc-shaped ridge 14 and the thermal plastic elastomer injection port 15 in the gap 313 are very close to the coupling elements 32, with the arc-shaped ridge 14 having the front end 141 and the rear end 142 being at the substantial same height, the thermal plastic elastomer 21 extruded by the thermal plastic elastomer injection port 15 is mostly filled in the slits 321 inside the adjacent coupling elements 32, and the residual thermal plastic elastomer 21 is filled in a partial portion defined in the gap 313 of the pair of support-tapes 31. As mentioned above, by adjusting the vertical position of the rear guide wheel 42, the height of the thermal plastic elastomer 21 inside the gap 313 can be properly adjust, so that the thermal plastic elastomer 21 can be further injected into the inner chamber 324 of each of the coupling elements 32, thereby allowing the thermal plastic elastomer 21 injecting into the slits 321, the gap 313 and the inner chamber 324 to be integrally formed, and an optimal connecting relation can be established with the coupling elements 32. As shown in FIG. 3, because the core 325 is disposed in the inner chamber 324, the arc-shaped ridge 14 having a wider width and a stronger injection power are required for enabling the thermal plastic elastomer 21 to be injected into the inner chamber 324.

As such, if the height of the arc-shaped ridge 14 is 0.45 mm and the thickness of the pair of support-tapes 31 is 0.50 mm, the height of the thermal plastic elastomer 21 inside the gap 313 is at least 0.05 mm. Moreover, by properly increasing the width of the arc-shaped ridge 14, the width of the gap 313 can be widened, so that the stability of the slide fastener 3 being moved on the arc-shaped ridge 14 can be enhanced, and the volume of the thermal plastic elastomer 21 injected into the slits 321 inside the adjacent coupling elements 32 can be increased, and the width of the gap 313 occupied by the thermal plastic elastomer 21 can also be increased.

As a matter of fact, the width of the arc-shaped ridge 14 being greater than the width of the gap 313 without being applied with a transversal pulling force is set according to the size of the slide fastener 3, take a C-type zipper as an example, the width of the arc-shaped ridge 14 adopted in a NO. 3 and NO. 5 slide fastener is about 0.3 mm to 1.2 mm greater than the width of the gap 313, and the width of the arc-shaped ridge 14 adopted in a NO. 8, NO. 10 and NO. 5 invisible slider fastener is about 0.5 mm to 3.0 mm greater than the width of the gap 313; because the combination of the coupling elements and the support-tapes of a S-type zipper and a L-type zipper is more stable, the width of the arc-shaped ridge 14 adopted in the S-type zipper similar to the above-mentioned C-type zipper and the L-type zipper similar to the above-mentioned C-type zipper can be slightly smaller than that of the C-type zipper, for example the width of the arc-shaped ridge 14 of S40, S60, L #3 and L #5 is increased by about 0.3 mm to 1.0 mm, and that of S80, S100, L #8 and L #10 is increased by about 0.3 to 1.8 mm. The increased width of the arc-shaped ridge 14 is about 0.3 mm to 3.0 mm, which is 0.3 mm to 3.0 mm greater than the original width of the gap 313, so that the thermal plastic elastomer injection port 15 having a wider width can be disposed on the arc-shaped ridge 14, thereby preventing the thermal plastic elastomer injection port 15 from being blocked by an coupled-portion generated while the coupling elements 32 being coupled, and the difficulty of thermal plastic elastomer injection can be decreased.

By the means of increasing injection power of the thermal plastic elastomer 21 or adjusting the shapes of the coupling elements 32, the thermal plastic elastomer 21 can be ensured of being filled in the slits 321 inside the adjacent coupling elements 32 and can also be further injected into a partial portion and/or the whole portion defined inside the inner chamber 324, so that the thermal plastic elastomer 21 can be prevented from being released from the coupling elements 32, and the water impervious function and the durability can be enhanced.

As shown in FIG. 5, which discloses a relation between the thermal plastic elastomer injection mold and the slide fastener while the thermal plastic elastomer injection operation being processed; when the slide fastener 3 is in a coupled status, the core 325 is disposed in the inner chamber 324, so that the arc-shaped ridge 14 having a wider width and the stronger injection power are required, wherein the stronger injection power can be provided via increasing the tightness of the slide fastener 3 being held on the arc-shaped ridge 14, so that the thermal plastic elastomer 21 can be filled in the slits 321 of the adjacent coupling elements 32, the inner chamber 324 and a partial portion defined inside the gap 313, then the thermal plastic elastomer 21 inside the gap 313 of the pair of support-tapes 31 is processed with a cutting operation, for example a cutting tool is utilized for longitudinally cutting (a cutting line is coded as 314), so that the slide fastener 3 processed with the thermal plastic elastomer injection operation of the thermal plastic elastomer injection mold 1 can be formed with a water impervious structure having separable and water impervious function. As mentioned above, the gap 313 can be widened by adopting the arc-shaped ridge 14 having the wider width, and the coupled portion generated while the coupling elements 32 being mutually coupled can be reduced, so that the widened width of the gap 313 generated while being applied with the transversal force can be pre-eliminated when the slide fastener 3 is in use, and the width of the cutting line 314 of the thermal plastic elastomer 21 inside the gap 313 can be reduced, thereby increasing the water impervious function of the slide fastener.

Figure 6:
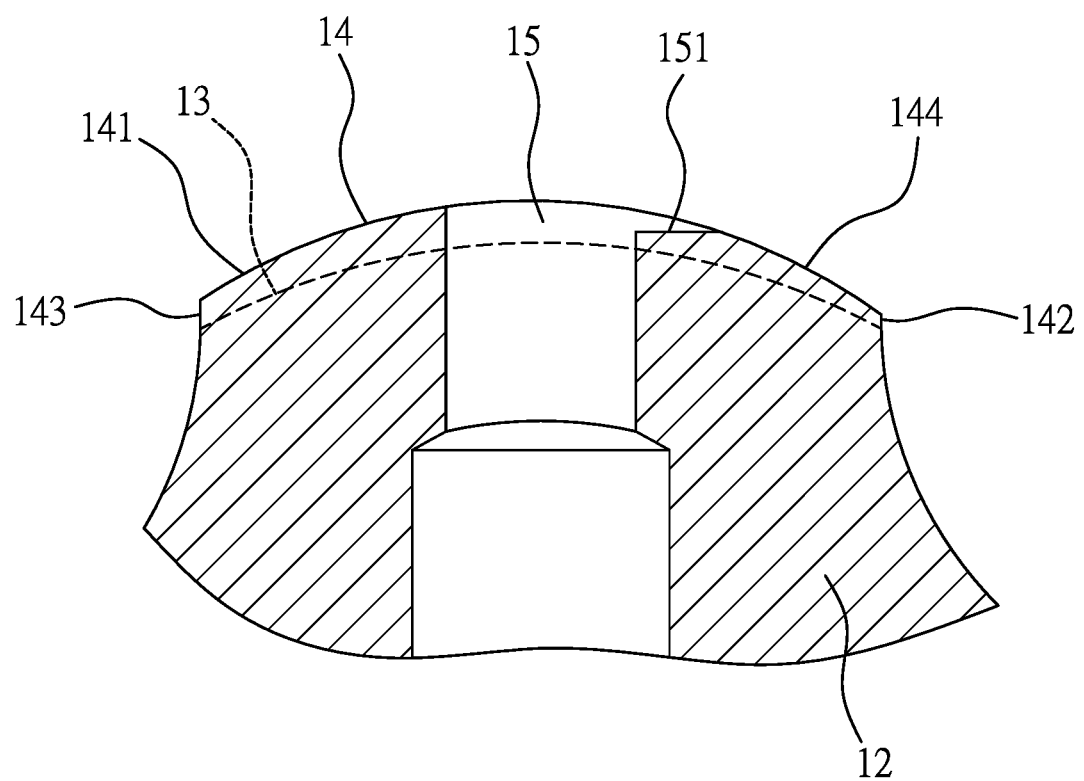
FIG. 6 is a cross sectional view illustrating the thermal plastic elastomer injection mold according to a third embodiment of the present invention.

Please refer to FIG. 6, which is a cross sectional view illustrating the thermal plastic elastomer injection mold 1 according to a third embodiment of the present invention, the same codes shared by this embodiment and the first embodiment are defined as the same components which provide the same functions, because there are a lot of components shared by this embodiment and the previous embodiments, only the differences between the this embodiment and the first embodiment will be illustrated as followings; the height of the front end 141 of the arc-shaped ridge 14 is higher than the height of the rear end 142; the thermal plastic elastomer injection port 15 is installed with an inclined recess 151 at a rear portion thereof, and the inclined recess 151 is formed with a depth which is gradually reduced; as such, as mentioned above, when the rear guide wheel 42 is at a lower position, the vertical position of the rear end 142 is able to control the height of the thermal plastic elastomer 21 inside the gap 313; and when the rear guide wheel 42 is at a higher position, the slide fastener 3 is separated from the certain point of the arc-shaped ridge 14 defined along the longitudinal length of the arc-shaped ridge 14, so that the height of the thermal plastic elastomer 21 inside the gap 313 is defined by the height of the separation point of the slide fastener 3 being separated from the arc-shaped ridge 14. Moreover, the depth of the inclined recess 151 is gradually reduced to zero towards the rear end 142, so that a surface of the rear end 142 is formed with a flattening surface 144 having a predetermined length, for example at least 1 mm, and without any recess, and the flattening surface 144 is utilized for flattening a surface of the thermal plastic elastomer 21 inside the gap 313.

As mentioned above, the thermal plastic elastomer injection port 15 is served to allow the thermal plastic elastomer 21 to be directly filled in the slits 321 inside the adjacent coupling elements 32 and the inner chamber 324, and the thermal plastic elastomer 21 extruded from the inclined recess 151 is served to fill the interior of the gap 313, and the thermal plastic elastomer 21 is formed in an elongated shape inside the gap 313, so that the height of the thermal plastic elastomer 21 inside the gap 313 is gradually increased from the bottom layer 322 of the coupling elements 32 towards the first surface 311, and the thermal plastic elastomer 21 can be prevented from being adhered on the first surface 311. Because the rear end 142 of the arc-shaped ridge 14 is formed with the flattening surface 144 having the length of at least 1 mm, the flattening surface 144 is able to be utilized for flattening the surface of the thermal plastic elastomer 21 inside the gap 313. As such, the height of the thermal plastic elastomer 21 inside the gap 313 is defined by the height of the rear end 142 and the vertical position of the rear guide wheel 42, for example the height of the rear end 142 is 0.15 mm, if the thickness of the support-tapes 31 is 0.50 mm, the height of the thermal plastic elastomer 21 inside the gap 313 is about at least 0.35 mm.

Figure 7:
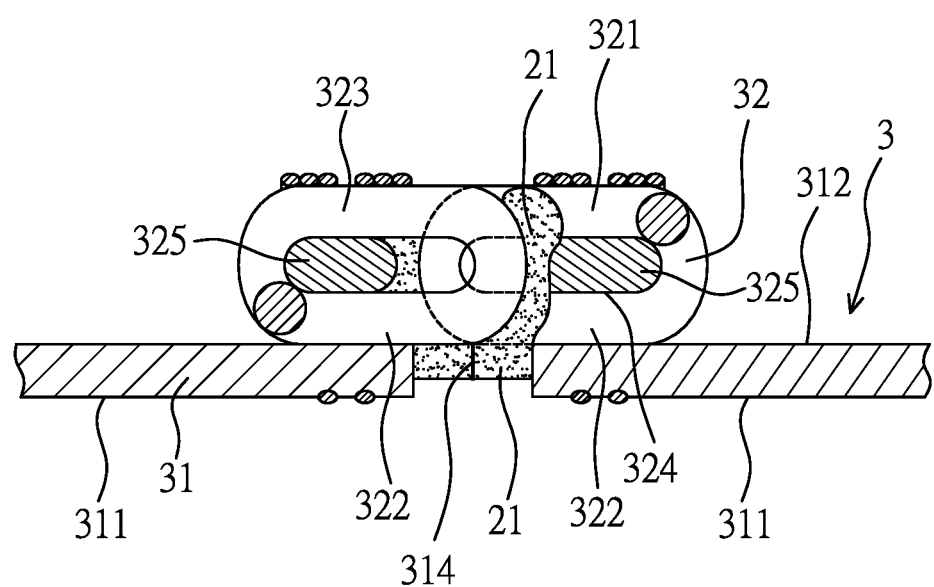
FIG. 7 is a cross sectional view illustrating the slide fastener after being processed with the thermal plastic elastomer injection operation by utilizing the thermal plastic elastomer injection mold of FIG. 6.

Please refer to FIG. 7, which is a cross sectional view illustrating the slide fastener after being processed with the thermal plastic elastomer injection operation by utilizing the thermal plastic elastomer injection mold 1 according to the third embodiment of the present. Because the arc-shaped ridge 14 is installed with the inclined recess 151, and the rear end 142 is lower than the front end 141, and the thermal plastic elastomer 21 is filled in the slits 321 inside the adjacent coupling elements 32 and the gap 313 of the pair of support-tapes 31, when the rear guide wheel 42 is at a lower position, a distance between the thermal plastic elastomer 21 inside the gap 313 and the first surface 311 is substantially the same as the height of the rear end 142 of the arc-shaped ridge 14. As mentioned above, by adjusting the width of the arc-shaped ridge 14 and the injection power, when the thermal plastic elastomer 21 is injected into the gaps 313 and into the slits 321 of the coupling elements 32 and the inner chamber 324, the thermal plastic elastomer 21 is capable of continuously covering the bottom layers 322 of the coupling elements 32 and the inner chambers 324 so as to form a continuous body, thereby increasing the water impervious effect of the slide fastener. Lastly, the elongated thermal plastic elastomer 21 inside the gap 313 is longitudinally cut (the cutting line is coded as 314), so that the slide fastener 3 processed with the thermal plastic elastomer injection operation of the thermal plastic elastomer injection mold 1 can be formed with a water impervious structure having separable and water impervious function.

Figure 8:
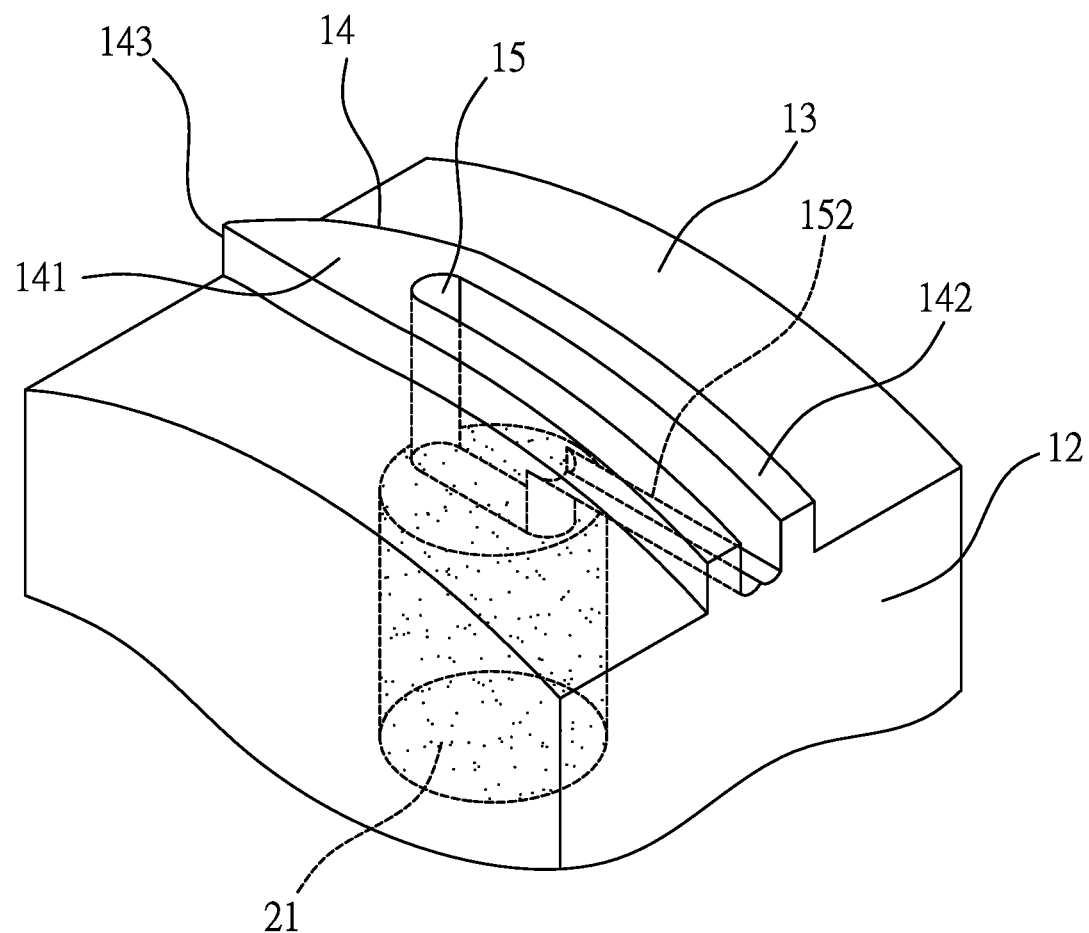
FIG. 8 is a perspective view illustrating the thermal plastic elastomer injection mold according to a fourth embodiment of the present invention.
Figure 9:
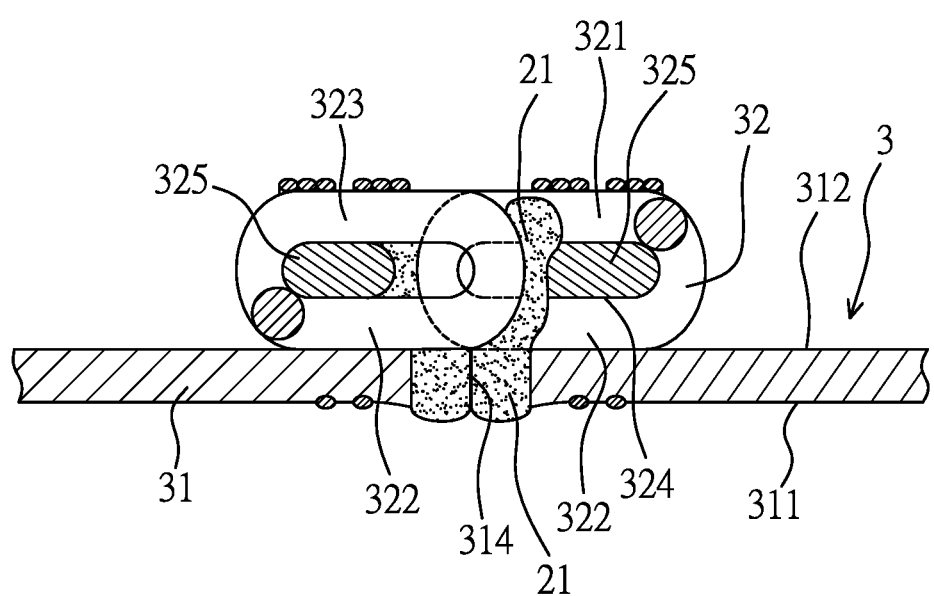
FIG. 9 is a cross sectional view illustrating an invisible zipper after being processed with the thermal plastic elastomer injection operation by utilizing the thermal plastic elastomer injection mold of FIG. 8.

Please refer to FIG. 8 and FIG. 9, which are a perspective view illustrating the thermal plastic elastomer injection mold 1 according to a fourth embodiment of the present invention and a water impervious slide fastener fabricated by the thermal plastic elastomer injection mold 1; the same codes shared by this embodiment and the third embodiment are defined as the same components which provide the same functions, because there are a lot of components shared by this embodiment and the previous embodiments, only the differences between this embodiment and the third embodiment will be illustrated as followings: the height of the front end 141 and the height of the rear end 142 of the arc-shaped ridge 14 are substantially the same; the thermal plastic elastomer injection port 15 is installed with an elongated recess 152 at a rear portion thereof, and the elongated recess 152 is extended to the rear end 142 of the arc-shaped ridge 14; with the elongated recess 152, the thermal plastic elastomer 21 cannot only be filled in the gap 313, but also can be further protruded out from the surfaces 311 of the pair of support-tapes 31.

As such, with different cross sectional shapes of the elongated recess 152, the appearance of the thermal plastic elastomer 21 inside the gap 313 can be correspondingly altered, for example a M-like shape or an arc shape, so that the appearance of the thermal plastic elastomer 21 shown on the first surfaces 311 of the pair of support-tapes 31 can be altered for providing different visual effects, and the water impervious effect can also be effectively increased. As shown in FIG. 9, the C-type zipper is adopted as the slider fastener 3, a specially-designed slider is required for accommodating the protruded thermal plastic elastomer 21, for example a slim passageway is formed from the top end to the bottom end of the slider for corresponding to a path of the thermal plastic elastomer 21 inside the slider, thereby preventing the thermal plastic elastomer 21 and the slider from generating any friction, the above-mentioned is a well-known art, therefore no further illustration is provided. Lastly, the elongated thermal plastic elastomer 21 inside the gap 313 is longitudinally cut (the cutting line is coded as 314), so that the slide fastener 3 processed with the thermal plastic elastomer injection operation of the thermal plastic elastomer injection mold 1 can be formed with a water impervious structure having separable and water impervious function.

Figure 10:
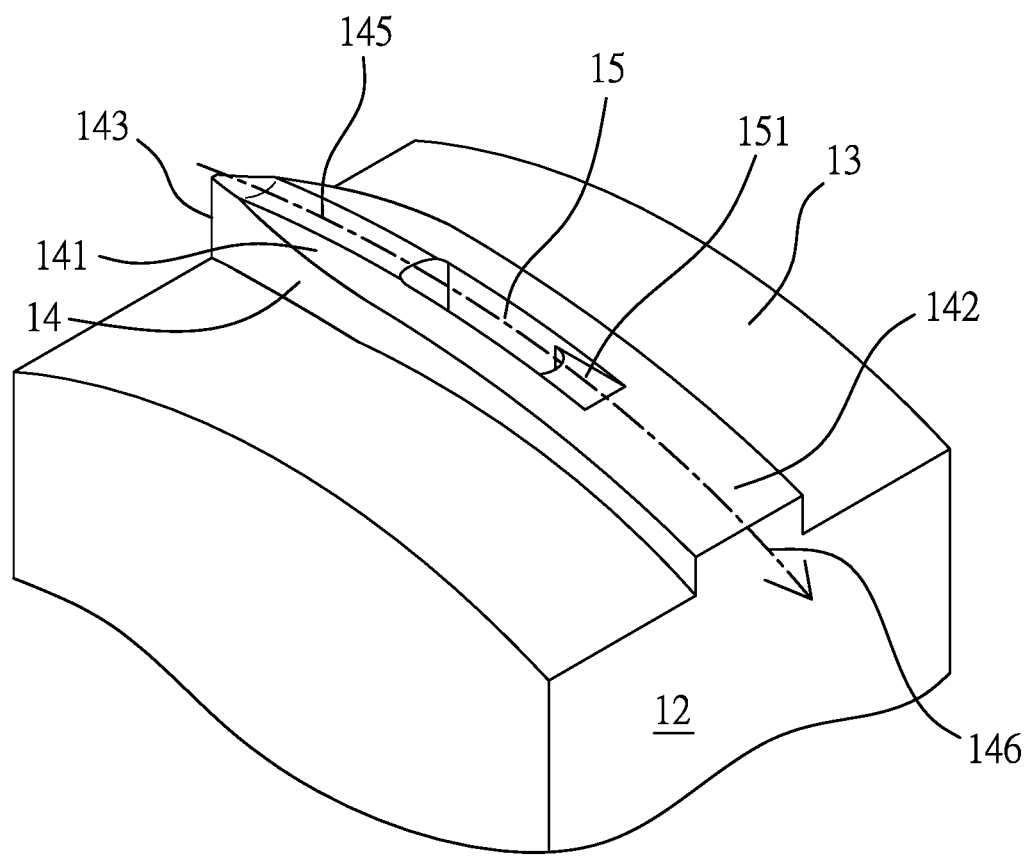
FIG. 10 is a perspective view illustrating the thermal plastic elastomer injection mold according to a fifth embodiment of the present invention.

Please refer to FIG. 10, which is a perspective view illustrating the thermal plastic elastomer injection mold according to a fifth embodiment of the present invention; the same codes shared by this embodiment and the first embodiment are defined as the same components which provide the same functions, because there are a lot of components shared by this embodiment and the previous embodiments, only the differences between this embodiment and the first embodiment will be illustrated as followings: a surface of the front end 141 of the arc-shaped ridge 14 is formed with a guide slot 145, the dimension and the depth of the guide slot 145 are corresponding to the dimension and the shape of the two rows of coupling elements 32, so that the slide fastener 3 can be guided for being stably displaced on a transversal axial line 146 of the arc-shaped ridge 14, thereby increasing the thermal plastic elastomer injection quality and efficiency of the slide fastener 3.

Figure 11:
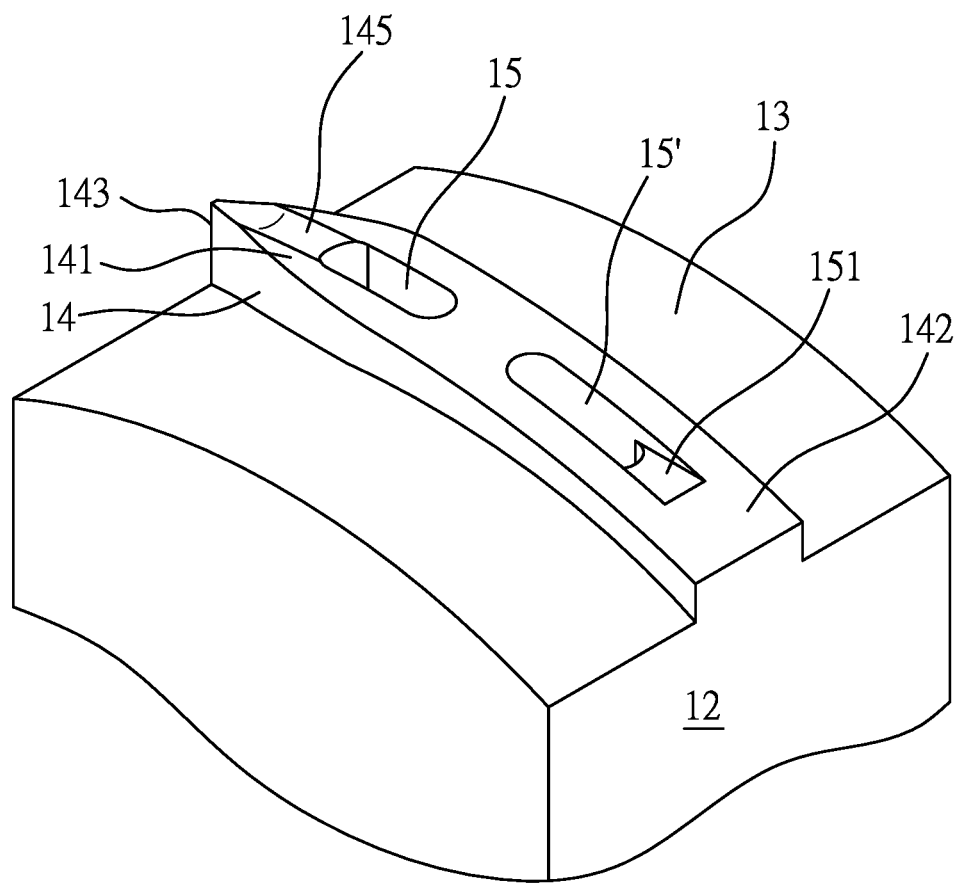
FIG. 11 is a perspective view illustrating the thermal plastic elastomer injection mold according to a sixth embodiment of the present invention.

Please refer to FIG. 11, which a perspective view illustrating the thermal plastic elastomer injection mold according to a sixth embodiment of the present invention; the same codes shared by this embodiment and the fifth embodiment are defined as the same components which provide the same functions, because there are a lot of components shared by this embodiment and the previous embodiments, only the differences between this embodiment and the fifth embodiment will be illustrated as followings: the height of the front end 141 of the arc-shaped ridge 14 is higher than that of the rear end 142, and the arc-shaped ridge 14 is disposed with the thermal plastic elastomer injection port 15 and a second thermal plastic elastomer injection port 15'.

Wherein, the thermal plastic elastomer injection port 15 is mainly served to allow the thermal plastic elastomer 21 to be injected into the slits 321 inside the adjacent coupling elements 32 and the inner chambers 324, and the second thermal plastic elastomer injection port 15' is installed with an inclined recess 151 at a rear portion thereof, the second thermal plastic elastomer injection port 15' and the inclined recess 151 are served to allow the thermal plastic elastomer 21 to be injected into the gap 313 of the pair of support-tapes 31.

According to this embodiment, the thermal plastic elastomer injection mold 1 can be connected to an extruder, and the thermal plastic elastomer injection port 15 and the second thermal plastic elastomer injection port 15' are both served to allow the thermal plastic elastomer 21 to be injected into the slits 321 inside the adjacent coupling elements 32 and the inner chambers 324, and the interior of the gap 313.

Figure 12:
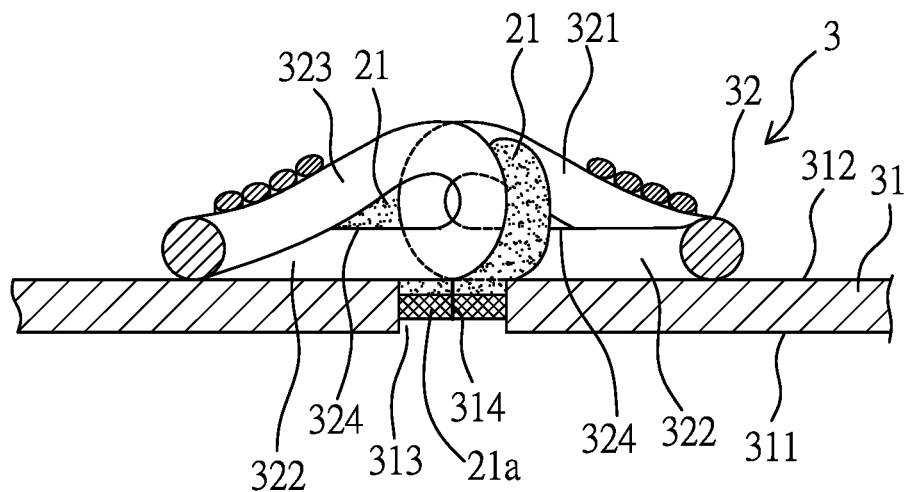
FIG. 12 is a cross sectional view illustrating a woven-in zipper after being processed with the thermal plastic elastomer injection operation by utilizing the thermal plastic elastomer injection mold of FIG. 11.

Please refer to FIG. 12, according to this embodiment, the thermal plastic elastomer injection port 15 and the second thermal plastic elastomer injection port 15' can be respectively connected to an extruder and a second extruder, so that the thermal plastic elastomer injection port 15 and the second thermal plastic elastomer injection port 15' can allow the thermal plastic elastomer 21 and a second thermal plastic elastomer 21a having different materials and different colors to be injected, the thermal plastic elastomer 21 of the thermal plastic elastomer injection port 15 is injected into the slits 321 inside the adjacent coupling elements 32, the inner chambers 324 and a partial portion defined inside the gap 313 of a woven-in slider fastener 3 having no core, and the second thermal plastic elastomer 21a of the second thermal plastic elastomer injection port 15' is injected into the gap 313, so that the thermal plastic elastomer 21 and the second thermal plastic elastomer 21a are able to respectively provided with different materials and different colors to the slits 321 inside the adjacent coupling elements 32 and the gap 313 of the pair of support-tapes 31. The height of the second thermal plastic elastomer 21a inside the gap 313 is affected by the vertical position of the rear guide wheel 42. Lastly, the elongated thermal plastic elastomer 21 inside the gap 313 is longitudinally cut (the cutting line is coded as 314), so that the slide fastener 3 processed with the thermal plastic elastomer injection operation of the thermal plastic elastomer injection mold 1 can be formed with a water impervious structure having separable and water impervious function.

As a matter of fact, the above-mentioned thermal plastic elastomer 21 is selected from a group consisting of a thermal-melting glue and a reactive thermal-melting glue, for example reactive-TPU (thermoplastic urethane), TPU, silicon, nylon, and TPEE (thermoplastic polyester elastomer), but what shall be addressed is that the scope of the present invention is not limited to the above-mentioned materials.

Moreover, the thermal plastic elastomer injection operation cannot only be processed from the slits 321, the thermal plastic elastomer injection operation can also be processed from a surface of the top layer 323 of the coupling elements 32, in other words a double-surface glue injecting operation can be achieved, thereby allowing the water impervious function to be enhanced and more visual effects to be provided to the appearance.

Figure 13:
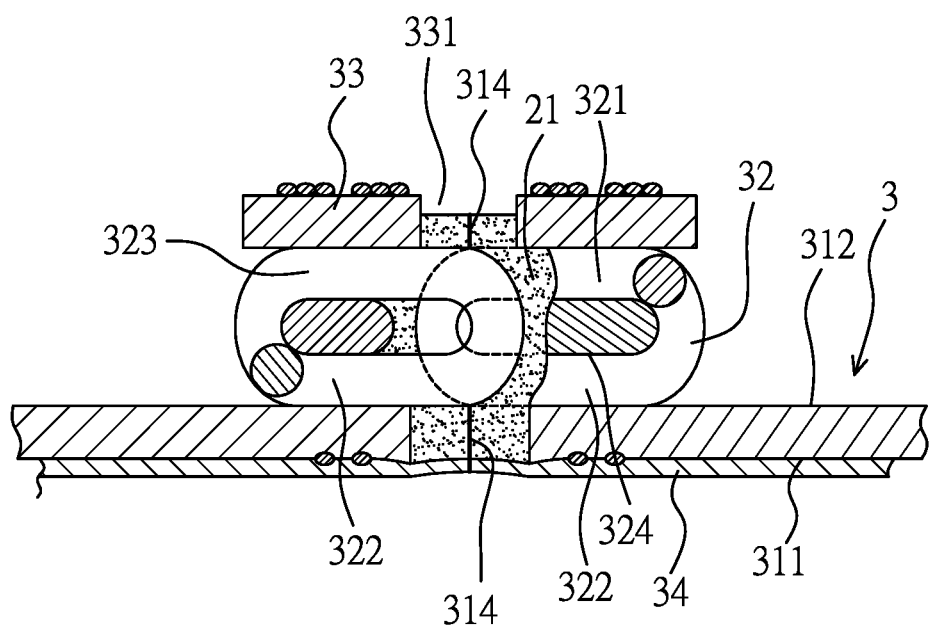
FIG. 13 is a cross sectional view illustrating the slide fastener after being processed with the double-surface thermal plastic elastomer injection operation by utilizing the thermal plastic elastomer injection mold of FIG. 6.

Please refer to FIG. 13, which is a cross sectional view illustrating the slide fastener after being processed with the double-surface thermal plastic elastomer injection operation by utilizing the thermal plastic elastomer injection mold of FIG. 6; in other words, if the thermal plastic elastomer injection operation is desired to be processed from the surface of the top layer 323 of the slide fastener 3, an insulation layer is still required for preventing the high-temperature thermal plastic elastomer injection mold (not shown in figures) from being in contact with the coupling elements 32, an auxiliary support-tape 33 is disposed on the surface of the top layer 323 of the two rows of coupling elements 32 respectively, so that an auxiliary slit 331 is formed between the auxiliary support-tapes 33. As such, one or two kinds of the thermal plastic elastomer can be injected into the slits 321 inside the adjacent coupling elements 32 or further injected into the inner chambers 324 respectively from the gap 313 or the auxiliary gap 331, and an elongated thermal plastic elastomer of one of the two kinds can be injected into the gap 313 and the auxiliary gap 331 respectively.

As a matter of fact, the auxiliary support-tape 33 cannot only be utilized for insulating the thermal plastic elastomer injection mold and forming the auxiliary gap 331 for the purpose of thermal plastic elastomer injection, the auxiliary support-tape 33 can also be utilized for increasing the combining strength of the coupling elements 32 and the pair of support-tapes 31. As such, when being sewed, a feeding length of the pair of auxiliary support-tapes 33 can be slightly longer than that of the pair of support-tapes 31, thereby enhancing the softness of the water impervious slide fastener. Lastly, the elongated thermal plastic elastomer 21 inside the gaps 313, 331 are longitudinally cut (the cutting line is coded as 314), so that the slide fastener 3 processed with the thermal plastic elastomer injection operation of the thermal plastic elastomer injection mold 1 can be formed with a water impervious structure having separable and water impervious function.

The water impervious fasten slider can be selected from a group consisting of a woven-in zipper (S-type zipper), a continued coil zipper (C-type zipper) with core, a continued invisible-coil zipper and a continued clap zipper (L-type zipper), wherein the continued coil zipper (C-type zipper) or the continued invisible-coil zipper can be selected to work with the pair of auxiliary support-tapes 33, or a continued coreless coil zipper and the continued invisible-coil zipper can be selected to be processed with the thermal plastic elastomer injection operation, thereby ensuring the softness of the slide fastener. For further enhancing the water impervious function of the water impervious slide fastener, a water repellent operation can be processed after the thermal plastic elastomer injection operation, because the water repellent operation is a well-known art, therefore no further illustration is provided.

For further enhancing the water impervious function of the water impervious slide fastener, after the thermal plastic elastomer injection operation is processed, the first surfaces 311 of the water impervious slide fastener and the thermal plastic elastomer 21 inside the gap 313 are disposed with a waterproof layer 34 used for crossly covering. As shown in FIG. 13, according to this embodiment, the waterproof layer 34 can be bonded on at least one surface of the first surface 311 or the second surface 312 of the pair of support-tapes 31. In actual practice, the waterproof layer 34 can be a coated layer having patterns and being transparent or opaque, a waterproof film adhesion or a lamination. Wherein, an adhesive layer of the waterproof film adhesion can be selected from a group consisting of a thermal plastic adhesive, heat reactive thermal plastic adhesive, moisture reactive thermal plastic adhesive, two-liquid type adhesive and water-based TPU (thermal plastic urethane) adhesive, and the water repellent operation can be processed to a portion or the whole second surface 312 of the pair of support-tapes 31, because the water repellent operation is a well-known art, therefore no further illustration is provided.

Accordingly, with the provided embodiments for illustrating the thermal plastic elastomer injection mold 1, a conventional slide fastener can be formed as a water impervious slide fastener after being processed with the thermal plastic elastomer injection operation of the thermal plastic elastomer injection mold 1.

Moreover, the water impervious slide fastener is suitable to be applied in a garment, for example a cloth or pants, a portable device, for example, a hand bag or backpack, a camping tool, for example a tent or a sleeping bag, so that those products can be provided with the water impervious function.

Based on what has been disclosed above, advantages achieved by the present invention are as followings:

1. The thermal plastic elastomer injection mold is to utilize the height and the width of the arc-shaped ridge and the shape of the thermal plastic elastomer injection port for allowing the thermal plastic elastomer to pass the thermal plastic elastomer injection port so as to be injected into the gap of the fasten slider and into the slits inside the adjacent coupling elements, and the surface of the thermal plastic elastomer inside the gap is lower than the pair of support-tapes, or the surface of the thermal plastic elastomer inside the gap is higher than the pair of the support-tapes, thereby enabling the slide fastener to be provided with a basic water impervious function.
2. The thermal plastic elastomer injection mold allows the same or different thermal plastic elastomers to be injected in turns into the slits inside the adjacent coupling elements of the slide fastener and the gap of the pair of support-tapes, so that the thermal plastic elastomer inside the gap and the other thermal plastic elastomer inside the slits are provided with different materials or different colors.
3. After the thermal plastic elastomer injection operation is processed by utilizing the thermal plastic elastomer injection mold, the water repellent operation can be processed for further increasing the water impervious function of the water impervious slide fastener.
4. After the thermal plastic elastomer injection operation is processed by utilizing the thermal plastic elastomer injection mold, the waterproof layer can be additionally adhered on at least one surface of the pair of support-tapes of the slide fastener, thereby further increasing the water impervious function of the slide fastener.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An injection mold, comprising:
a mold base, formed with a slide fastener supporting platform having a top surface thereof formed with an arc-shaped surface, wherein said arc-shaped surface supports a pair of support-tapes of a slide fastener and is formed with a transversally elongated arc-shaped ridge thereon, two ends of said arc-shaped ridge are respectively formed with a front end and a rear end, and said front end is formed with a wedge-shaped tip capable of being inserted into a gap formed between said pair of support-tapes, thereby allowing said gap to be transversally displaced with said arc-shaped ridge, and a surface of said arc-shaped ridge is longitudinally formed with a injection port connected to at least one extruder; and
a thermal plastic elastomer, extruded out from said at least one extruder and passing said injection port so as to be injected into said gap and into slits inside two rows of coupling elements disposed at inner edges of said pair of support-tapes, wherein said slide fastener is formed with a water impervious structure after said thermal plastic elastomer inside said gap is cut.

2. The injection mold as claimed in claim 1, wherein said injection mold further comprises a fasten seat, adjacent surfaces of said fasten seat and said mold base are correspondingly formed with at least one fasten hole and at least one connection hole, and a connection m ember is allowed to pass each of said connection holes and locked in each of said fasten holes, thereby enabling said mold base to be disposed on said fasten seat.

3. The injection mold as claimed in claim 1, wherein a surface of said front end of said arc-shaped ridge is formed with a guide slot capable of guiding motions of said two rows of coupling elements and accommodating said two rows of coupling elements.

4. The injection mold as claimed in claim 1, wherein a height of said arc-shaped ridge is lower than a thickness of said pair of support-tapes, so that said thermal plastic elastomer is able to be filled in said gap, said slits and an inner chamber of each of said coupling elements.

5. The injection mold as claimed in claim 1, wherein said injection port is installed with an inclined recess at a rear portion thereof, and a height of said thermal plastic elastomer inside said gap is controlled with respect to a height of said rear end and an adjustment of a vertical position of a rear guide wheel of a transmission mechanism.

6. The injection mold as claimed in claim 1, wherein a surface of said rear end is formed with a flattening surface having a predetermined length, and said flattening surface is utilized for flattening a surface of said thermal plastic elastomer inside said gap.

7. The injection mold as claimed in claim 1, wherein said injection port is installed with an elongated recess at a rear portion thereof, said elongated recess is extended to said rear end, so that said thermal plastic elastomer is able to be filled in said gap, or said thermal plastic elastomer is able to be further protruded out from said gap.

8. The injection mold as claimed in claim 1, wherein said injection port is installed with an inclined recess at a rear portion thereof, and a width of said arc-shaped ridge is 0.3 mm to 3.0 mm greater than a width of said gap.

9. The injection mold as claimed in claim 1, wherein a height of said front end of said arc-shaped ridge is higher than that of said rear end, and said arc-shaped ridge is disposed with said injection port and a second injection port, wherein said second injection port is installed with an inclined recess at a rear portion thereof, said second injection port and said inclined recess are served to allow a second thermal plastic elastomer to be injected into said gap, and said second injection port is connected to at least one second extruder; and said thermal plastic elastomer and said second thermal plastic elastomer have different materials or different colors, said thermal plastic elastomer being extruded from said at least one extruder is able to be filled in said slits inside said two rows of continued coupling elements and said second thermal plastic elastomer being extruded from said at least one second extruder is able to be filled in said gap, so that said thermal plastic elastomer inside said slits and said second thermal plastic elastomer inside said gap are provided with different materials or different colors.

10. The injection mold as claimed in claim 1, wherein said thermal plastic elastomer is selected from a group consisting of reactive-TPU (thermoplastic urethane), TPU, silicon, nylon, and TPEE (thermoplastic polyester elastomer).

11. The injection mold as claimed in claim 1, wherein said fasten slider is selected from a group consisting of a woven-in zipper (S-type zipper), a continued coil zipper (C-type zipper), a continued coreless coil zipper, a continued invisible-coil zipper and a continued clap zipper (L-type zipper).

* * * * *